United States Patent [19]

Kurakazu et al.

[11] Patent Number: 4,975,593
[45] Date of Patent: Dec. 4, 1990

[54] MICROCOMPUTER WITH SYNCHRONIZED DATA TRANSFER

[75] Inventors: Keiichi Kurakazu, Tachikawa; Haruo Keida, Tokorozawa; Kazuyoshi Kikuta, Mitaka, all of Japan

[73] Assignees: Hitachi, Ltd.; Hitachi Microcomputer Engineering, Ltd., both of Tokyo, Japan

[21] Appl. No.: 255,255

[22] Filed: Oct. 11, 1988

Related U.S. Application Data

[63] Continuation of Ser. No. 640,465, Aug. 13, 1984, abandoned.

[30] Foreign Application Priority Data

Oct. 14, 1983 [JP] Japan .................................. 58-190776

[51] Int. Cl.⁵ .......................... H03K 5/13; G06F 1/00
[52] U.S. Cl. .................................... 307/269; 307/480; 328/55; 328/63; 328/72; 364/200; 364/900
[58] Field of Search .............. 307/480, 481, 269; 328/55, 63, 62, 72; 364/200, 900, 239, 239.1, 239.9, 251.4; 365/230.01, 233, 230.08

[56] References Cited

U.S. PATENT DOCUMENTS

| | | | |
|---|---|---|---|
| 4,293,927 | 10/1981 | Hoshii | 307/269 |
| 4,409,671 | 10/1983 | Daniels et al. | 307/269 |
| 4,568,841 | 2/1986 | Mayhew | 304/480 |

*Primary Examiner*—Timothy P. Callahan
*Attorney, Agent, or Firm*—Antonelli, Terry, Stout & Kraus

[57] ABSTRACT

A single-chip microcomputer has external terminals outputting a system clock signal, an address signal, and a data signals. External equipment such as an external memory is operated by address and signal which are output when the system clock signal changes. In the single-chip microcomputer of this invention, the operation of an address signal output circuit and that of a data signal output circuit are controlled by a signal output from a digital delay circuit which receives the system clock signal. According to this circuit construction, the hold time between the change in the system clock and the change in the address and data signals is determined by the delay circuit which exhibits a digital operation, so that the hold time can be set accurately without being affected adversely by any variation in the circuit elements due to the manufacturing process, or by temperature changes.

10 Claims, 3 Drawing Sheets

MICROCOMPUTER WITH SYNCHRONIZED DATA TRANSFER

This is a continuation of application Ser. No. 640,465, filed Aug. 13, 1984, now abandoned.

BACKGROUND OF THE INVENTION

This invention relates to a semiconductor integrated circuit and to a technique which is effective when applied to a single-chip microcomputer, for example.

In a device such as a single-chip microcomputer, address signals and data signals are transferred to an external bus in synchronism with a system clock. On the other hand, external equipment such as an external memory or a peripheral interface LSI circuit is constructed in such a manner that it reads in these transferred address or data signals at the fall of the system clock. Accordingly, address and data signals input to external equipment must be delayed with respect to the system clock, for a period of time needed for the external equipment to hold the address and data signals.

In a conventional microcomputer or the like, however, the delay with respect to the system clock of address or data signals is determined by a circuit delay of an output buffer circuit or the like. The inventors of this invention have discovered that, in this case, the delay time varies with variations in the elements of the output buffer circuit, due to variations in the process of manufacturing the elements, or temperature changes, so that the holding of the address and data signals in the external equipment can be extremely unstable.

SUMMARY OF THE INVENTION

It is therefore an object of the present invention to provide a semiconductor integrated circuit which has, an output function capable of reliably setting a hold time, when transferring signals on an internal bus to an external bus in synchronism with a timing signal.

This and other objects and novel features of this invention will become more apparent from the following description, taken in conjunction with the accompanying drawings.

The following is the outline of a typical example of the inventions disclosed herein. A timing signal cf a phase which is delayed with respect to a predetermined timing signal is generated, and a signal on an internal bus is transferred to an external bus in synchronism with the phase-delayed timing signal. This arrangement makes it possible to secure a hold time necessary for the external equipment to read in the signal.

DESCRIPTION OF THE PREFERRED EMBODIMENT

Figure 1:
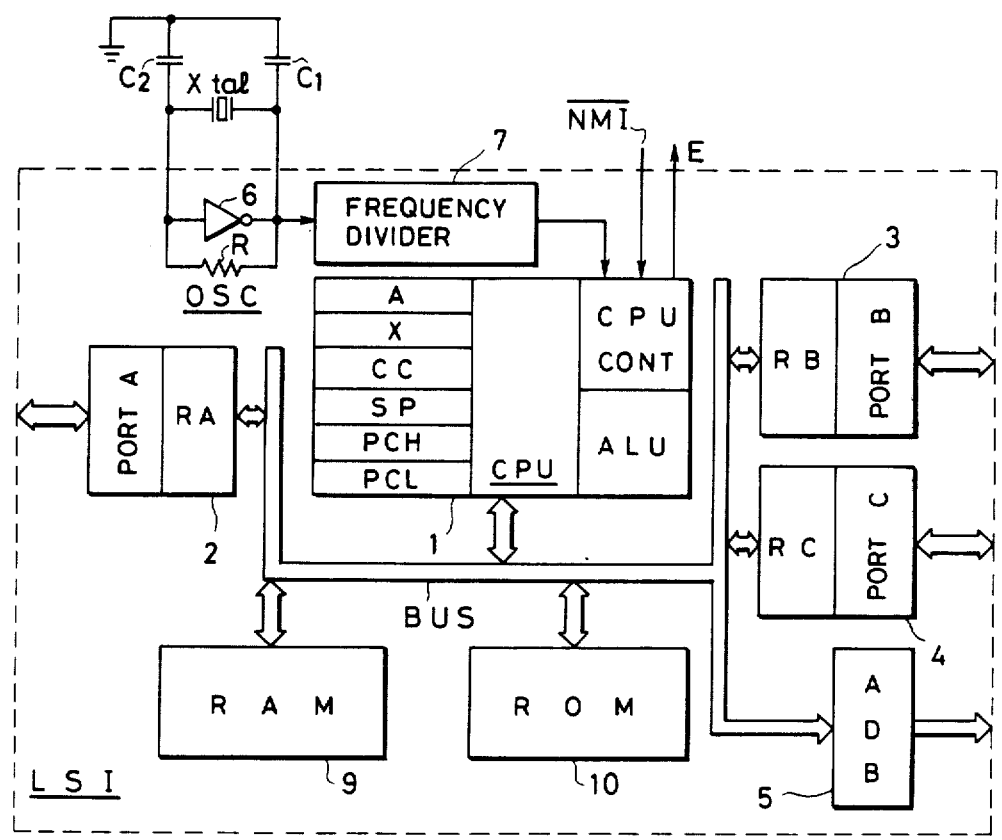
FIG. 1 is a block diagram of an embodiment in which the present invention is applied to a microcomputer.

FIG. 1 is a block diagram of one embodiment of the present invention, applied to a single-chip microcomputer. In the figure, all the circuit blocks surrounded by the dashed line are formed on a single semiconductor substrate, such as a silicon substrate, by heretofore known techniques of manufacturing semiconductor integrated circuits. Each of these circuit blocks is constituted by a CMOS circuit, although it is not particularly limited thereto.

Reference numeral 1 denotes a microprocessor CPU The principal component blocks thereof are typical of such a microprocessor CPU. In other words, the microprocessor consists of an accumulator A, an index register X, a condition code register CC, a stack pointer SP, program counters PCH and PCL, an arithmetic and logic unit ALU, a CPU controller CPUCONT, etc. The CPU controller CPUCONT receives an external signal such as a non-maskable interrupt signal $\overline{NM1}$ and outputs a system clock signal E to external equipment (not shown in the figure). The construction and operation of each block constituting the microprocessor is well known, and hence is not described in detail here.

Reference numerals 2 through 5 denote input and output ports. Among them, ports 2 through 4 are input/output ports, although they are not particularly limited thereto. The operations of these input/output ports 2–4 are controlled by control data that is preset in data direction registers RA–RC.

Reference numeral 6 denotes an amplification circuit formed of an oscillation circuit A bias resistor R is inserted between the input and output of the oscillation circuit An external elements consisting of a quartz crystal unit Xtal and capacitors $C_1$ and C is connected between the input and output terminals of the amplification circuit 6 in order to generate oscillations. An oscillation output thereof is input to a frequency division circuit 7. This arrangement forms various system clock signals necessary for the operation of the microprocessor CPU.

Reference numeral 9 denotes a RAM (random-access memory) which is primarily used as a memory circuit for temporary data. Reference numeral 10 denotes a ROM read-only memory) into which programs for processing various data are written.

Reference numeral 5 denotes an address buffer which transfers address signals external equipment.

All the circuit blocks described above are connected by a bus line BUS consisting of an address bus line and a data bus line.

Figure 4B:
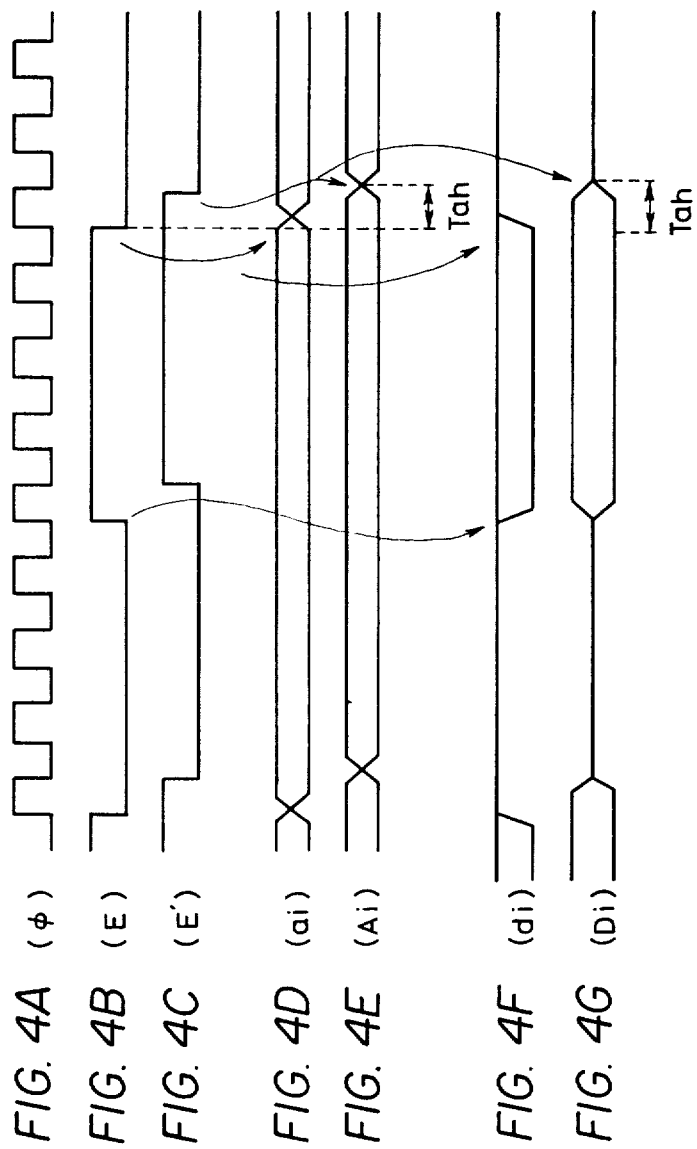
FIG. 4 is a timing chart illustrating the operation of the circuit of the embodiment.

The timing signal E is the system clock output to external equipment, and is used by the external equipment as a hold timing signal for data or address signals transferred from the microcomputer. Although not specifically limited thereto, this timing signal E is formed by dividing by four the frequency of an original oscillation signal $\phi$ (FIG. 4A) generated by the oscillation circuit OSC, as shown in FIG. 4B.

Figure 2:
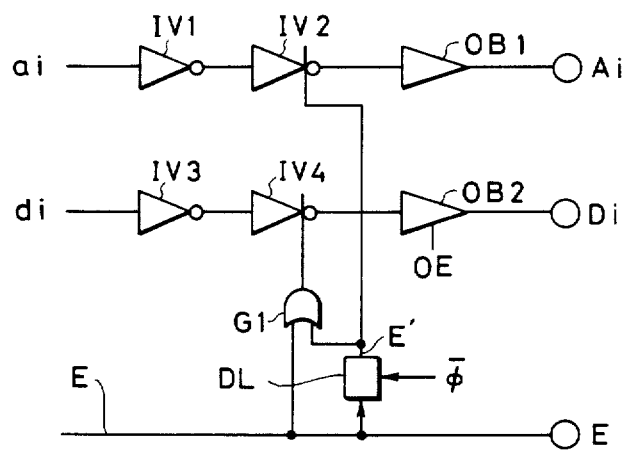
FIG. 2 is a circuit diagram of an embodiment of the circuit outputting address and data signals.

FIG. 2 shows a unit circuit forming an address buffer ADB, a unit port circuit, and a timing conversion circuit of this embodiment.

In this embodiment, the address and data signals to be transferred to the external bus (not shown) are generated by the timing conversation circuit of FIG. 2, in synchronism with the timing signal E' of a phase which is delayed with respect to the system clock.

Figure 3:
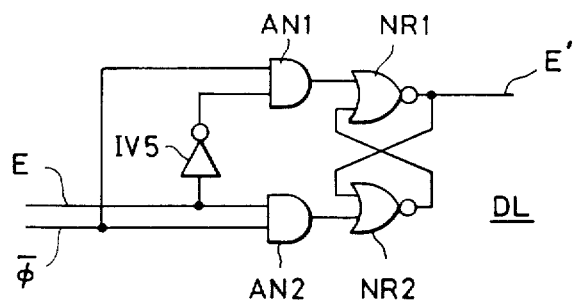
FIG. 3 is a specific circuit diagram of block DL of FIG. 2.

The timing conversion circuit consists of an OR gate G1 and a delay circuit DL The system clock E is converted to the timing signal E' whose phase is delayed by the delay circuit DL. Although it is not particularly limited thereto, the delay circuit DL has a construction such that its delay is determined by a reference pulse signal. The delay circuit DL can be formed, for example as shown in FIG. 3, of a flip-flop circuit consisting of NOR circuits NR1 and NR2, AND circuits AN1 and AN2, and a gate circuit consisting of an inverter IV5. The timing signal E and a signal $\overline{\phi}$, whose level is inverted with respect to the original oscillation signal a, are input to the gate circuit.

As shown in FIG. 4B, the level of the timing signal E changes in synchronism with the rise of the original oscillation signal $\phi$. In accordance with a circuit shown in FIG. 3, the level of the timing signal E' (FIG. 4C) output from the NOR circuit NR1 changes in synchronism with the fall of the original oscillation signal $\phi$, that is, the rise of the signal $\overline{\phi}$. In other words, the timing of the change in the timing signal E' is delayed by half the period of the original oscillation signal $\phi$, with respect to the timing signal E.

The unit circuit forming the address buffer ADB consists of an inverter IV1, a clocked inverter IV2, and an output buffer OB1, as shown in FIG. 2, although the construction is not particularly limited thereto. The clocked inverter IV2 is actuated when the clock signal applied to it drops to a low level, to form an output signal of a level corresponding to the input signal. The clocked inverter IV2 becomes inoperative when the clock signal rises to a high level. In this construction, an address signal ai on the internal address bus line is input to the inverter Iv1. An output signal from the inverter Iv1 is supplied to the input of the clocked inverter IV2, although this is not particularly limitative. An output of the clocked inverter IV2 is transferred from an external terminal Ai to the external bus line (not shown) through the output buffer OB1.

The unit circuit forming the input/output port consists of an inverter IV3, a clocked inverter IV4 and an output buffer OB2, for example. The output buffer OB2 consists of a tri-state circuit, and its operation is controlled by an output enable signal OE. When the output enable signal OE is at low level, for example, the output of the output buffer OB2 is either floating or at a high impedance. The unit circuit forming the input/output port includes an input circuit for receiving the signals supplied to an external terminal Di, together with the output circuit shown in the figure, but this input circuit is not shown in the figure because it is irrelevant to the subject matter of the present invention.

A data signal di on the internal data bus line is input to the inverter IV3. Although not limited thereto in particular, an output signal of the inverter IV3 is supplied to the input of the clocked inverter IV4. An output of the clocked inverter IV4 is transferred to the external data bus line (not shown) from the external terminal Di through the output buffer OB.

In this embodiment, the timing signal E' is supplied to the clock terminal of the clocked inverter IV2, and the output signal from the OR gate G1, which receives the timing signal E' and the system clock E, is supplied to a clock terminal of the clocked inverter IV4. According to this arrangement, the signal ai on the internal bus line is supplied to the output buffer OB1 in synchronism with the phase-delayed timing signal E'. The clocked inverter IV4 supplies the signal di on the internal bus to the output buffer OB2 in synchronism with the timing signals E and E', and also latches the signal.

The operation of the circuit of this embodiment will now be described with reference to the timing chart of FIG. 4.

The system clock E is formed by dividing by four an approximately, 4 MHz reference frequency signal $\phi$, although this is not particularly limitative, so that the system clock E is at about 1 MHz.

As described above, the delay signal E' becomes a signal of a phase which is delayed by $\frac{1}{2}$ after that of the reference frequency signal by the delay circuit, utilizing the reference frequency signal $\phi$.

Although it is not particularly limited thereto, the address signal ai is transferred to the internal bus in synchronism with the falling edge of the system clock E, as shown in FIG. 4D. On the other hand, the data signal di is transferred to the internal bus in synchronism with the rising edge of the system clock E, as shown in FIG. 4F. The internal data bus has a high impedance during the period in which the system clock E is at low level. The address signal ai and the data signal di thus transferred to the internal bus are supplied to the inputs of the clocked inverters IV2 and IV4 through the inverters Iv1 and IV3, respectively. The clocked inverter IV2 is operative during the period in which the delayed timing signal E' is at a low level, so that the address signal on the internal bus in supplied to the output buffer OB1 with the.delay described above. The clocked inverter IV2 is inoperative during the period in which the timing signal E' is at a high level so that, during this time, the clocked inverter IV2 does not accept any input supplied thereto At the same time, the inverter IV2 provides a latch operation so that the signal output therefrom is at the previous signal level.

The timing of the operation of the clocked inverter IV4 is different from that of the clocked inverter IV2. If the clocked inverter IV4 is operated only by the signal E' output from the delay circuit DL, the data signal output from the clocked inverter IV4 is not changed even when the timing signal E is at high level, unless the timing signal E' is also at high level. In this case, the effective period of the data signal being supplied to external equipment such as an external memory (not shown) when the timing signal E is at high level is shortened by a delay which is determined by the delay circuit DL. If the effective period of the data signal being output to the external terminal Di is thus reduced, the possibility could arise that access to the external equipment by the data signal is not sufficient. Therefore, this embodiment sets the timing of the timing signal supplied to the clocked inverter IV4 in order to prevent any reduction in the effective period of the data signal. The OR circuit G1 is provided for this purpose. The clocked inverter IV4 is operative during the period in which the system clock E or the timing signal E' is at high level, and supplies the signal on the internal bus to the output buffer OB2. In this case, too, the clocked inverter IV4 does not accept any input during the period in which the timing signal E' and the system clock E are at low level, in the same way as described above. The clocked inverter IV4 holds the previous signal at its output, in the same way as above.

Accordingly, the address signal Ai and the data signal Di output through the output buffers OB1 and OB2 are accurately transferred with a delay as described above, even when the system clock E falls. In consequence, the external equipment (not shown) receives the address signal Ai and the data signal Di transferred thereto, with the delay with respect to the system clock E, in synchronism with the falling edge of the system clock E. Since the delay is set in this case, a hold time Tah can be ensured at least for the phase delay (even if the delay of the signal along the output path is assumed to be zero). Therefore, the output equipment can reliably receive the signals.

The present invention provides the following effects.

(1) An address signal or a data signal can be transferred to an external bus in synchronism with a timing signal whose phase is delayed with respect to a system clock, so that a hold time can be set. Accordingly, even if there is any variation in the circuit elements or a temperature change, the effects thereof can be compensated for, and the signal can be received by the external equipment reliably.

(2) Since a signal of a phase which is delayed with respect to a system clock is formed on the basis of a reference frequency signal, the delayed signal can be formed without being adversely affected by the variations in the elements, etc.

(3) The effect described in (2) provides another effect in that the hold time can be stabilized.

(4) A delayed signal can be provided by an extremely simple circuit, because the phase of the delayed signal need only be delayed with respect to the system clock.

Although the invention has been described above with reference to one preferred embodiment thereof, it must be understood that the invention is not specifically limited thereto, and various changes and modifications can of course be made without departing from the scope and spirit thereof. For instance, the timing signal E' E may be formed by a delay circuit using an inverter or the like. The output buffers may be controlled by the use of the delay signal E' instead of the control signal OE. It is also obvious that, even if the system clock E is not transferred, the timing signal for the transfer of the address signal to the external equipment can replace the system clock E. Various system configurations can of course be employed for the microcomputer.

Although the invention has been described primarily with reference to a single-chip microcomputer which is the technical field used as the background of the present invention, it can also be applied widely to any semiconductor integrated circuit device which transfers a signal on an internal bus to external equipment in synchronism with a clock signal, such as a digital semiconductor integrated device typified by a microprocessor.

What is claimed is:

1. A microcomputer having a first external terminal which provides a reference timing signal to external equipment, a second external terminal which provides a data signal to said external equipment and a third external terminal which provides an address signal to said external equipment, said external equipment reading in said data signal and said address signal at a time of change of said reference timing signal, said microcomputer comprising:

timing signal generating means coupled to said first external terminal and for providing said reference timing signal to said first external terminal, wherein said timing signal generating means includes a timing signal generator for providing a timing signal and dividing means coupled to receive said timing signal for providing said reference timing signal to said first terminal;

a delay circuit including a digital delay means which is coupled to receive said timing signal and to receive said reference timing signal and which forms a delayed timing signal delay with respect to said reference timing signal, wherein the amount of delay of said delayed timing signal is determined by said timing signal;

a gate circuit coupled to said delay means and said first terminal for logically combining said delayed timing signal output from said delay means and the reference timing signal supplied to said first terminal;

a microprocessor;

a bus line coupled to said microprocessor for receiving an internal data signal and an internal address signal to be fed from said microprocessor;

first output means coupled to said bus line, to receive said delayed timing signal from said delay means, and coupled to said second external terminal, and for providing a data signal in accordance with said internal data signal to said second external terminal, wherein said first output means is controlled by said digital delay means so that said first output means keeps providing said data signal to said second external terminal until a predetermined time after the change of said reference timing signal; and second output means coupled to said bus line, to an output signal of said gate circuit and to said third external terminal, and for providing an address signal in accordance with said internal address signal to said third external terminal, wherein said second output means is controlled by said gate circuit so that said second output means keeps providing said address signal to said third external terminal until a predetermined time after the change of said reference timing signal.

2. A microcomputer as defined in claim 1, wherein said digital delay means comprises a flip-flop circuit having its input terminals coupled to receive said reference timing signal and said timing signal, respectively, and an output terminal for providing said delayed timing signal, wherein said flip-flop circuit has first and second gates whose inputs and outputs are cross-coupled to each other, and one of said outputs of said first and second gates is coupled to said output terminal, wherein said first and second gates further have their inputs coupled to receive said reference timing signal and said timing signal, respectively.

3. A microcomputer as defined in claim 1, wherein said first output means is controlled by said delayed timing signal so that said first output means keeps providing said data signal to said second external terminal from before the change of said reference timing signal until a predetermined time after said change, and wherein said second output means is controlled by said output signal so that said second output means keeps providing said address signal to said third external terminal from before the change of said reference timing signal until a predetermined time after said change.

4. A microcomputer comprising:

amplifying means for providing a reference frequency signal which changes between first and second states at a predetermined first frequency;

frequency division means coupled to the amplifying means for generating a reference timing signal which changes between first and second voltage levels at a predetermined second frequency;

a clock signal output terminal coupled to frequency division means for receiving the reference timing signal;

a delay circuit including digital delay means coupled to the amplifying means and to the frequency division means for generating a delayed timing signal having first and second potential levels, and having substantially the same frequency as the reference timing signal but delayed relative thereto, the amount of delay of the delayed timing signal being determined by the predetermined first frequency of the reference frequency;

signal output terminal for providing an output signal; and output means coupled to the delay circuit and to the signal output terminal and responsive to an internally generated output signal, for coupling the internally generated output signal to the signal output terminal in response to at least the delayed timing signal being at the first potential level and for uncoupling the internally generated output signal from the signal output terminal in response to the delayed timing signal changing to the second potential level from the first potential level, whereby the microcomputer keeps providing the output signal from the signal output terminal after the reference timing signal changes to the first voltage level from the second voltage level.

5. The microcomputer of claim 4, further comprising:
a microprocessor; and
bus means for coupling the microprocessor to the output means.

6. The microcomputer of claim 5, further comprising: read only memory means coupled to the bus means for storing program data to be executed by the microprocessor therein.

7. The microcomputer of claim 6, further comprising: random access memory means coupled to the bus means for storing temporary data therein.

8. The microcomputer of claim 5, wherein the reference timing signal is a system clock output from the microcomputer.

9. The microcomputer of claim 5, wherein the frequency division means includes means for dividing by four the predetermined first frequency of the reference frequency signal.

10. The microcomputer of claim 4, wherein the digital delay means includes a flip-flop circuit having its input terminals coupled to receive said reference frequency signal and said reference timing signal, respectively, and an output terminal for providing said delayed timing signal, wherein said flip-flop circuit has first and second gates whose inputs and outputs are cross-coupled to each other, and wherein one of said outputs of said first and second gates is coupled to said output terminal, wherein said first and second gates further have their inputs coupled to receive said reference frequency signal and said reference timing signal, respectively.

* * * * *